United States Patent [19]

Yuki

[11] Patent Number: 4,627,919

[45] Date of Patent: Dec. 9, 1986

[54] RESOLVING AGENT

[75] Inventor: Yoichi Yuki, Himeji, Japan

[73] Assignee: Daicel Chemical Industries, Ltd., Osaka, Japan

[21] Appl. No.: 821,084

[22] Filed: Jan. 21, 1986

[51] Int. Cl.$^4$ .............................................. B01B 15/08
[52] U.S. Cl. ................................. 210/656; 210/198.2; 210/502.1; 502/402
[58] Field of Search ................... 210/656, 198.2, 502.1; 502/401, 402, 408

[56] References Cited

U.S. PATENT DOCUMENTS

| | | | |
|---|---|---|---|
| 4,431,546 | 2/1984 | Hughes et al. | 210/502.1 |
| 4,511,475 | 4/1985 | Yuki | 210/656 |
| 4,512,898 | 4/1985 | Oi et al. | 210/502.1 |
| 4,551,245 | 11/1985 | Ramsden | 502/401 |
| 4,565,877 | 1/1986 | Wada et al. | 210/656 |

*Primary Examiner*—John Adee
*Attorney, Agent, or Firm*—Flynn, Thiel, Boutell & Tanis

[57] ABSTRACT

A racemic mixture can be optically resolved by liquid chromatography, using a packing of the compound:

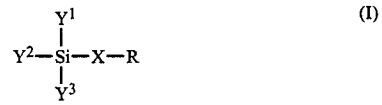

wherein at least one group selected from among $Y^1$, $Y^2$ and $Y^3$ represents silica gel and/or a siloxane bond moiety therewith and others represent each a hydrogen atom, an alkyl group having one to 20 carbon atoms, an aryl group having six to 20 carbon atoms, an arylalkyl group having seven to 20 carbon atoms, a halogen atom, a hydroxyl group, an alkoxy group having one to 20 carbon atoms or a combination thereof; X represents a spacer having one to 20 carbon atoms; and R represents a metallic slat of optically active t-leucine or tryptophane.

6 Claims, No Drawings

RESOLVING AGENT

BACKGROUND OF THE INVENTION

1. Field of the Invention

This invention relates to a novel resolving agent. More particularly it relates to a packing for liquid chromatography with which a racemic mixture can be optically resolved. The resolving agent proposed by the present invention comprises silica gel as a support, a spacer moiety which introduced by reacting a silane treating agent with said support and a metallic salt of optically active D- or L-tryptophane, or D- or L-tert.-Leucine, chemically bonded to said spacer.

2. Statement of Prior Arts

Conventional packings for optical resolution wherein optically active proline or hydroxyproline is bonded to silica gel include those reported by G. Gübitz et al. (cf. J. High Resolut. Chromatogr. and Chromatogr. Comm., 2, 145 (1979)), K. Sugden et al. (cf. J. Chromatogr., 192, 228 (1980)) and V. A. Davankov et al. (Angew, Chem. and Ed. Engl., 21, 930 (1982)). Each packing as described above has a carboxyl group bonded to a copper ion via a coordinate or ionic bond and resolves a racemic mixture by taking advantage of the difference in the free energy of interaction between enantiomers of a racemic amino acid capable of coordinating with said carboxyl group.

However optically active groups which are known as available in these packings for optical resolution are limited in number, i.e. 2-azetidinecarboxylic acid, proline, hydroxyproline, allohydroxyproline, valine, histidine, cysteinic acid, aspartic acid, serine, threonine, tyrosine, alanine and isoleucine.

We have studied to further improve the properties of these conventional packings for optical resolution and consequently achieved the present invention.

That is, each of known optically active groups is effective in resolving only limited amino acids so that it is very difficult to optically resolve some amino acids therewith.

SUMMARY OF THE INVENTION

Under these circumstances we have found that a particular packing for optical resolution comprising optically active tryptophane or t-leucine can optically resolve some amino acids including alanine, glutamic acid and leucine, which have been only hardly resolved, since the above packing exhibits a very effective steric and hydropholic interaction, thus completing the present invention.

Thus the present invention relates to a resolving agent which comprises a compound of the following general formula (I):

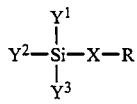
(I)

wherein at least one group selected from among $Y^1$, $Y^2$ and $Y^3$ represents silica gel and/or a siloxane bond moiety therewith and others represent each a hydrogen atom, an alkyl group having one to 20 carbon atoms, an aryl group having six to 20 carbon atoms, an arylalkyl group having seven to 20 carbon atoms, a halogen atom, a hydroxy group, an alkoxy group having one to 20 carbon atoms or a combination thereof; X represents a spacer having one to 30 carbon atoms; and R represents a metallic salt of optically active tryptophene or t-leucine.

The invention also provides a novel separation agent for the optical resolution of a racemic mixture which comprises the above defined compound.

The resolving agent of the present invention may be packed in a metallic or glass cylinder and employed in optically resolving racemic compounds with a conventional liquid chromatograph.

The packing for resolution of the present invention comprising the compound of the general formula (I) which consists of silica gel to which an optically active group is bonded via a silane treating agent. Now each constituent will be described in detail.

(A) SILICA GEL

The silica gel used as a material of the resolving agent of the present invention has a particle size of 0.1 μm to 1000 μm, preferably 1 μm to 100 μm, and a pore size of 10 Å to 10,000 Å, preferably 50 Å to 5000 Å.

(B) SILANE TREATING AGENT

Any known silane treating agent, which is represented by the following general formula (II), may be employed in forming the spacer moiety of the packing of the present invention:

(II)

In formula (II), Y, Y' and Y" represent each a hydrogen atom, an alkyl group having one to 20 carbon atoms, an aryl group having six to 20 carbon atoms, an arylalkyl group having seven to 20 carbon atoms, a halogen atom a hydroxyl group, an alkoxy group having one to 20 carbon atoms or a combination thereof. After the reaction of this silane treating agent with the silica gel, unreacted Y, Y' and/or Y" respectively coincide with residual $Y^1$, $Y^2$ and/or $Y^3$ of the compound of the general formula (I) which are not bonded to the silica gel.

X' represents a spacer forming group having one to 30 carbon atoms selected from among alkyl and aryl groups having a halogen atom or an amino or an oxirane group at one terminal or inside thereof. It may have a hetero atom. That is, it may contain a bond of any type selected from among ether, ester, amino and amide bonds. Thus X in the general formula (I) is a residue obtained after X' in formula (II) is bonded to R.

The silane treating agent of the general formula (II) has a functional group capable of forming a covalent bond by reacting with an amino group. Examples thereof are as follows:

(1) those wherein X' is —CH₂Cl or —CH₂Br:
chloromethyldimethylchlorosilane,
chloromethylethoxysilane,
bromomethyldimethylchlorosilane,
chloromethylmethyldichlorosilane,
chloromethylmethyldiethoxysilane,
chloromethyltrichlorosilane,
chloromethyltriethoxysilane,
chloromethyldimethyl-n-nitrophenoxysilane,
chloromethyldimethyl-p-nitrophenoxysilane,
chloromethyldimethyl-2-[(2-ethoxyethoxy)ethoxy]silane, chloromethyldimethylphenoxysilane,
1,2-bis(dimethylchlorosilyl)ethane and
allyloxychloromethyldimethylsilane, (2) those wherein X' is —CH$_2$CH$_2$CH$_2$Cl or —CH$_2$CH$_2$CH$_2$Br:

3-chloropropyltrimethoxysilane,
3-chloropropyldimethoxymethylsilane,
3-chloropropylmethyldichlorosilane,
3-chloropropyltrichlorosilane,
3-bromopropyldimethylchlorosilane,
3-bromopropyltrichlorosilane,
3-bromopropyltrimethoxysilane,
3-chloropropyldimethylchlorosilane,
3-chloropropylmethyldimethoxysilane,
3-chloropropyltriethoxysilane,
3-chloropropylphenyldichlorosilane and
n-propyl(3-chloropropyl)dichlorosilane, (3) those wherein X' is —CH$_2$CH$_2$Cl or

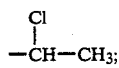

1-chloroethylmethyldichlorosilane,
2-chloroethylmethyldichlorosilane and
2-chloroethyltrichlorosilane, (4) those wherein X' is

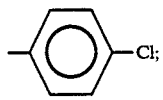

p-chlorophenyltrimethoxysilane and
p-chlorophenyltriethoxysilane, (5) those wherein X' is

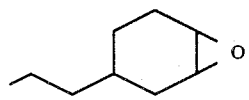

2-(3,4-epoxycyclohexylethyl)trimethoxysilane, (6) those wherein X' is

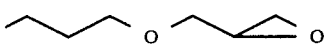

3-glycidoxypropyltrimethoxysilane,
diethoxy-3-glycidoxypropylmethylsilane,
dimethoxy-3-glycidoxypropylmethylsilane and
3-glycidoxypropyldimethylethoxysilane, (7) those wherein X' is an alkyl halogen;
8-bromooctyltrichlorosilane and
4-(methyldichlorosilyl)butyryl chloride, and (8) those X' is an acid chloride;
2-(4-chlorosulfonylphenyl)ethyltrichlorosilane,
2-(4-chlorosulfonylphenyl)ethyltrimethoxysilane and
3-(trichlorosilyl)propyl chloroformate.

(C) OPTICALLY ACTIVE GROUP

The optically active group R forming the characteristic moiety of the packing of the present invention is optically active trytophane of the following general formula:

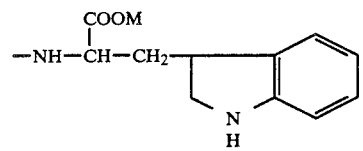

wherein M represents a metal. Examples of the metal are Cu$^{2+}$, Ni$^{2+}$, Zn$^{2+}$, Cd$^{2+}$, Hg$^{2+}$ and Co$^{3+}$.

Alternately the optically active group R is optically active t-leucine of the following general formula:

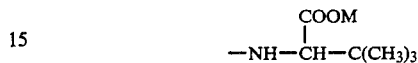

wherein M represents a metal. Examples of the metal are Cu$^{2+}$, Ni$^{2+}$, Zn$^{2+}$, Cd$^{2+}$, Hg$^{2+}$ and Co$^{3+}$.

The packing for optical resolution of the present invention may be prepared from these starting materials (A), (B) and (C) by treating the silica gel with the silane and binding the optically active group thereto. Alternately it may be prepared by previously bonding the silane treating agent to the optically active group followed by a reaction of the silica gel therewith. The conversion of a carboxyl group or its ester into a metal salt of a carboxylic acid may be performed either before or after the bonding to the silica gel. The metallic salt thus obtained may be converted into a copper salt by an exchange reaction between said metallic salt and a strong acid.

The resolving agent of the invention may be prepared by first treating silica gal (A) on the surface with a suitable, organic or inorganic compound and then reacting it with a silane agent (B) or an optically active group-having compound (C).

As described above, the resolving agent of the present invention comprises silica gel and an optically active group chemically bonded to said silica gel through a silane treating agent and is suitable as a packing for liquid chromatography particularly in optically resolving amino acids.

To further illustrate the present invention, and not by way of limitation, the following Synthetic Examples and Examples will be given.

SYNTHETIC EXAMPLE 1

Silica gel was dried by heating at 120° to 150° C. in vacuo for five hours. 20 g of the resulting dried silica gel was suspended in 120 ml of absolute benzene and 8 ml of glycidoxypropyltrimethoxysilane was added thereto. The reaction mixture was heated under reflux under a dry nitrogen stream. The reaction was allowed to continue for three hours. During this reaction period, the methanol thus formed was removed from the system. After the completion of the reaction, the mixture was cooled to room temperature and filtered through a glass filter. The modified silica gel thus obtained was washed with absolute benzene and dried at 40° C. in vacuo. 1.24 g of sodium salt of L-trypophane was dissolved in 30 ml of absolute methanol. 3.5 g of the above silica gel to which the glycidoxypropylsilyl group was introduced was added thereto and suspended therein. Then the obtained mixture was shaken at room temperature for four days.

The modified silica gel was filtered, washed with methanol and introduced into an aqueous solution prepared by dissolving 2 g of copper sulfate in 50 ml of distilled water to thereby give a copper salt. Then it was filtered again and washed with distilled water. Thus a compound wherein the copper salt of L-tryptophane was chemically bonded to silica gel was obtained.

The structural formula of the obtained compound is assumed as follows:

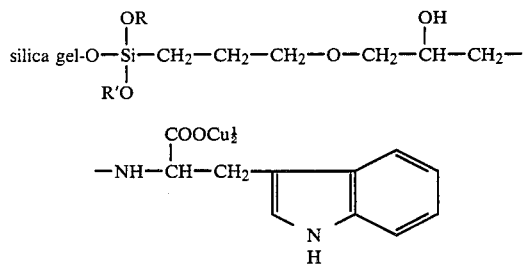

wherein one or both of R and R' represent each a methyl group or one or both thereof represent each of the same silica gel.

EXAMPLE 1

The packing as prepared in Synthetic Example 1 was used in optically resolving racemates of various amino acids in the following manner. That is, a packing obtaind from an entirely porous silica gel having an average particle size of 10 μm and an average pore size of 100 Å in the manner described in Synthetic Example 1 was packed in a stainless column (25 cm×0.46 cm) for high-performance liquid chromatography. Racemates of various amino acids were optically resolved therewith by flowing a $2.5 \times 10^{-4}$M aqueous solution of copper nitrate as a solvent at a rate of 1 ml/min at 50° C. The result of each resolution is good as shown in Table 1.

TABLE 1

| Amino acid | Capacity factor K'1 | Capacity factor K'2 | Separation factor (α) | Resolution factor (Rs) |
|---|---|---|---|---|
| α-alanine | 8.39 | 7.77 | 1.08 | 0.46 |
| leucine | 16.8 | 15.2 | 1.11 | — |
| aspartic acid | 12.4 | 9.45 | 1.32 | 0.93 |
| glutamic acid | 20.5 | 17.3 | 1.19 | 0.60 |
| glutamine | 21.0 | 17.1 | 1.22 | 0.45 |

In the above Table 1, each term is defined as follows.

$$\text{Capacity factor }(K') = \frac{\text{Retention time of antipode} - \text{Dead time}}{\text{Dead time}}$$

$$\text{Separation factor }(\alpha) = \frac{\text{Ratio by volume of antipode retained more intensively}}{\text{Ratio by volume of antipode retained less intensively}}$$

$$\text{Resolution factor }(Rs) = \frac{2 \times \begin{pmatrix} \text{Distance between peaks of} \\ \text{antipodes retained more} \\ \text{intensively and less} \\ \text{intensively} \end{pmatrix}}{\text{Total band-width of both peaks}}$$

COMPARATIVE EXAMPLE 1

A packing prepared by bonding a copper salt of L-proline to silica gel with the use of a silane treating agent having a glycidoxypropylsilyl group was packed in the same column as used in Example 1. Optical resolution of racemates of various amino acids was attempted with the use of the above column by flowing the same solvent as used in Exampe 1 at a rate of 1 ml/min. It was impossible to resolve α-alanine, glutamic acid, glutamine and leucine.

Structural formula;

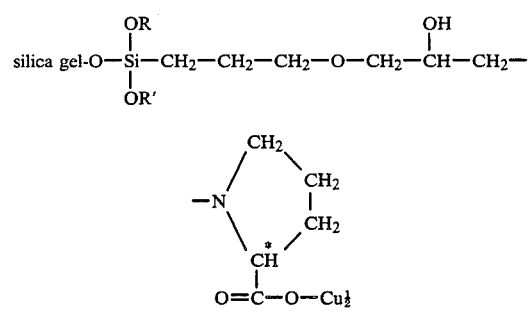

wherein one or both of R and R' represent each a methyl group or one or both thereof represent each the same silica gel.

SYNTHETIC EXAMPLE 2

Silica gel was dried by heating at 120° to 150° C. for five hours in vacuo. 20 g of the dried silica gel thus obtained was suspended in 120 ml of absolute benzene and 8 ml of glycidoxypropyltrimethoxysilane was added thereto. Then the mixture was heated under reflux under a dry nitrogen stream. The reaction was allowed to continue for three hours. During this period, the methanol thus formed was removed from the system. After the completion of the reaction, the mixture was cooled to room temperature and filtered through a glass filter. The modified silica gel thus obtained was washed with absolute benzene and dried at 40° C. in vacuo. 4.62 g of sodium salt of L-t-leucine was dissolved in 70 ml of absolute methanol and 14.5 g of the above silica gel to which the glycidoxypropylsilyl group was introduced was added thereto and suspended therein. The mixture was shaken at room temperature for four days.

The modified silica gel was filtered and washed with methanol. Then it was introduced into an aqueous solution prepared by dissolving 7.5 g of copper sulfate in 100 ml of distilled water to thereby give a copper salt. This copper salt was filtered again and washed with distilled water. Thus a compound wherein copper salt of L-t-leucine was chemically bonded to silica gel was obtained.

The structural formula of the obtained compound is assumed as follows:

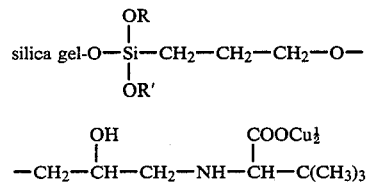

wherein one or both of R and R' represent each a methyl group or one or both thereof represent each the same silica gel.

EXAMPLE 2

The packing prepared in Synthetic Example 2 was employed in optically resolving racemates of various amino acids in the following manner. That is, a packing prepared from an entirely porous silica gel having an average particle size of 10 μm and an average pore size of 100 Å in the same manner as described in Synthetic Example 2 was packed into a stainless column (25 cm×0.46 cm) for high-performance liquid chromatography. Racemates of various amino acids were optically resolved with the above column by flowing a 2.5×10$^{-4}$M aqueous solution of copper sulfate as a solvent at a rate of 1 ml/min at 50° C. The resolution of each case is good as shown in the following Table 2.

TABLE 2

| Amino acid | Capacity factor K′1 | Capacity factor K′2 | Separation factor (α) | Resolution factor (Rs) |
|---|---|---|---|---|
| alanine | 5.31 | 5.91 | 1.11 | 0.91 |
| leucine | 8.97 | 10.1 | 1.13 | 0.95 |
| valine | 6.90 | 8.19 | 1.19 | 1.41 |
| serine | 4.14 | 5.10 | 1.23 | 1.87 |
| methionine | 6.38 | 7.57 | 1.19 | — |
| aspartic acid | 7.06 | 8.07 | 1.14 | 0.41 |
| phenylalanine | 8.72 | 11.71 | 1.34 | 1.70 |
| histidine | 16.4 | 22.8 | 1.39 | — |
| tryptophane | 13.1 | 19.0 | 1.46 | — |

COMPARATIVE EXAMPLE 2

A packing wherein copper salt of L-proline was bonded to silica gel via a silane treating agent having a glycidoxypropylsilyl group was packed in the same column as used in Example 2. Optical resolution of racemates of various amino acids was attempted with the above column by flowing the same solvent as used in Example 2 at a rate of 1 ml/min. It was impossible to resolve alanine and leucine.

Structural formula:

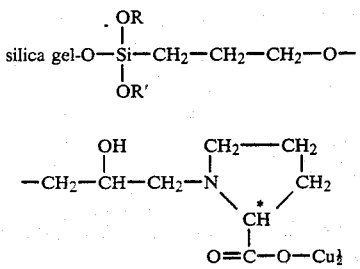

wherein one or both of R and R′ represent each a methyl group or one or both thereof represent each the same silica gel.

EXAMPLE 3

A racemate of phenylglycine was optically resolved in the same manner as described in Example 2 to give ratios by volume of D-phenylglycine (K′1) and L-phenylglycine (K′2) of 5.56 and 6.71, respectively. The coefficient of separation (α) of both compounds was 1.21 while the ratio of separation of the same (Rs) was 1.14.

The embodiments of the invention in which an exclusive privilege or property is claimed are defined as follows:

1. A method for the optical resolution of a racemic mixture with a compound having the formula:

wherein at least one group selected from among Y$^1$, Y$^2$ and Y$^3$ represents silica gel and/or a siloxane bond moiety therewith while others represent each a hydrogen atom, an alkyl group having one to 20 carbon atoms, an aryl group having six to 20 carbon atoms, an arylalkyl group having seven to 20 carbon atoms, a halogen atom, a hydroxyl group, an alkoxy group having one to 20 carbon atoms or a combination thereof; X represents a spacer having one to 30 carbon atoms; and R is a metal salt of optically active t-leucine or tryptophane.

2. A method as claimed in claim 1, in which R is a metal salt of tryptophane.

3. A method as claimed in claim 1, in which R is a metal salt of t-leucine.

4. A method as claimed in claim 1, in which said resolution is carried out by the liquid chromatography.

5. A method as claimed in claim 1, in which said metal is selected from copper, nickel, zinc, cadmium, mercury and cobalt.

6. A separation agent for the optical resolution of a racemic mixture which comprises a compound having the formula:

wherein at least one group selected from among Y$^1$, Y$^2$ and Y$^3$ represents silica gel and/or a siloxane bond moiety therewith while others represent each a hydrogen atom, an alkyl group having one to 20 carbon atoms, an aryl group having six to 20 carbon atoms, an arylalkyl group having seven to 20 carbon atoms, a halogen atom, a hydroxyl group, an alkoxy group having one to 20 carbon atoms or a combination thereof; X represents a spacer having one to 30 carbon atoms; and R is a metal salt of optically active t-leucine or tryptophane.

* * * * *